UNITED STATES PATENT OFFICE.

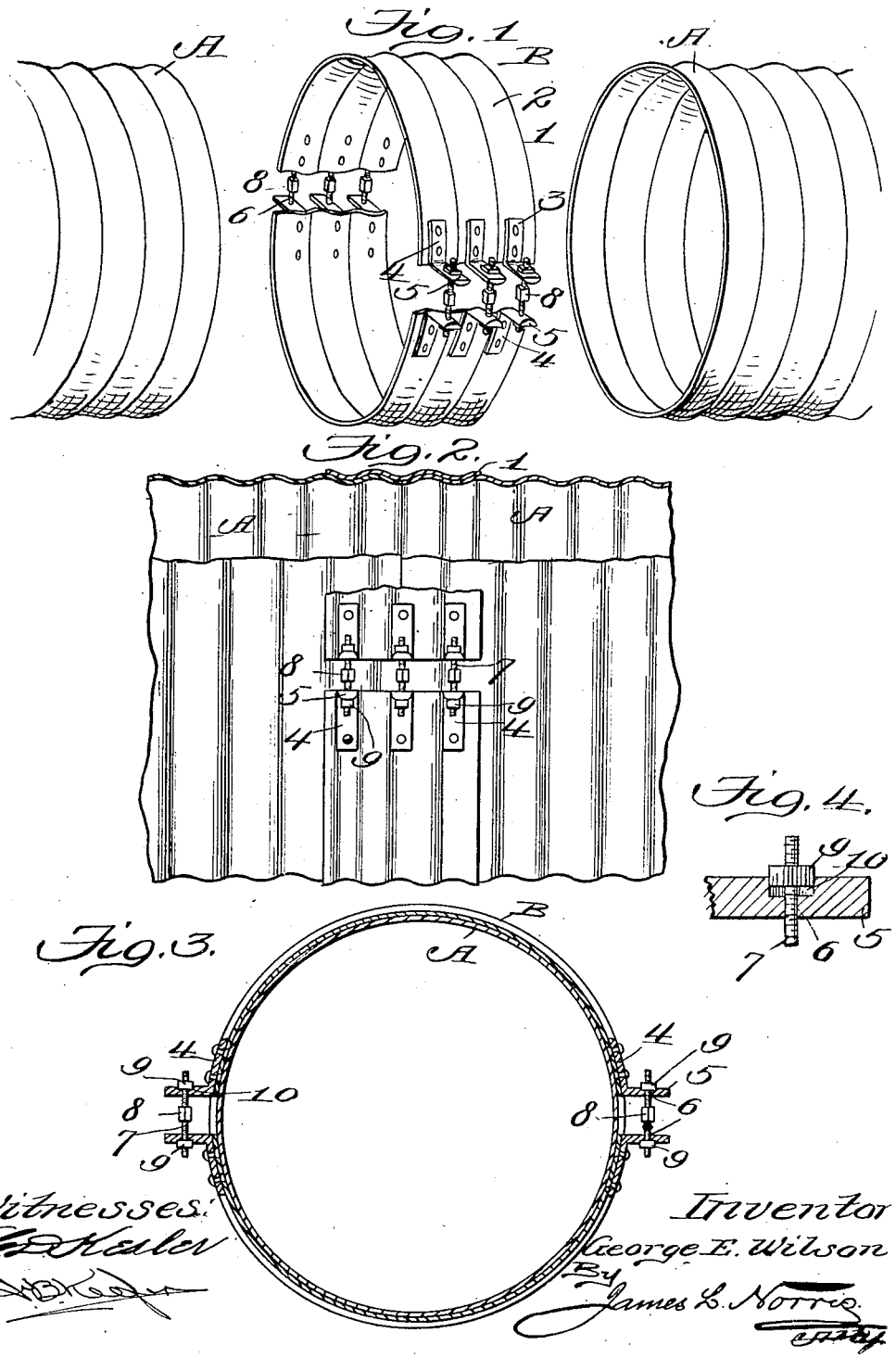

GEORGE E. WILSON, OF CLINTON, IOWA.

CONNECTION FOR CORRUGATED PIPES.

No. 926,532.　　　Specification of Letters Patent.　　　Patented June 29, 1909.

Application filed February 15, 1909.　Serial No. 478,076.

*To all whom it may concern:*

Be it known that I, GEORGE E. WILSON, a citizen of the United States, residing at Clinton, in the county of Clinton and State of Iowa, have invented new and useful Improvements in Connections for Corrugated Pipes, of which the following is a specification.

This invention relates to new and useful improvements in connections for corrugated pipes.

While the invention may be advantageously employed for use with corrugated pipes in general, it is particularly adapted for use in connection with corrugated sewer pipes or conduits.

The invention more particularly comprises a coupling device formed of two corrugated half rings which conformably fit over the adjacent ends of the pipes to be connected and which are connected to one another by means of turnbuckle devices. In connection with a structure of this particular type the primary object of the invention is to provide a coupling means having novel turnbuckle connecting devices, parts of the latter being secured to the half rings in such manner as to materially strengthen the same. The turnbuckle devices are also constructed so that they may be readily assembled with or removed from the half rings.

The structural details of the invention will be set forth at length in the following description which is to be read in connection with the accompanying drawing, the latter illustrating a preferred and advantageous embodiment of the improvement while in the claims appended at the end of the description I have set forth the features by which the invention is distinguished from the prior art.

In the said drawing: Figure 1 is a perspective view illustrating in detached relation the adjacent end portions of the pipes to be connected and the coupling device which coöperates with said end portions. Fig. 2 is a central longitudinal sectional view showing the coupling device assembled upon the end portions of the pipes. Fig. 3 is a transverse sectional view showing the same relation of elements. Fig. 4 is a detail sectional view illustrating the arrangement of the nuts upon the threaded shanks of the turnbuckle device.

Similar characters of reference refer to corresponding parts throughout the several views.

The end portions of the pipes to be connected are shown at A and the coupling device which forms the subject matter of the present invention is shown at B. Such coupling device comprises two similarly constructed half rings, as 1. Each half ring 1 is provided with peripheral corrugations, as 2, which engage conformably with the corrugations of the pipe sections A. By virtue of such engagement when the half rings 1 are tightened, a strong clamping action thereof is had which effectually seals all joints. The sections A are thus positively held against axial displacement such as would promote disengagement from the coupling device B. The relation of the parts above stated is shown more particularly in Fig. 2. Angle pieces, as 3, are secured to the ends of the half rings 1. These angle pieces are arranged one upon each corrugation and are of substantial L-shape, as is shown in Fig. 3, comprising curved legs, as 4, which are riveted or otherwise secured to the half rings 1, and horizontal outwardly projecting legs, as 5. When the half rings 1 are assembled upon the ends of the pipes to be coupled, the angle pieces 3 will be disposed in corresponding pairs, the legs 5 of the corresponding pairs being directly opposite one another and being formed with alined openings, as 6.

The turnbuckle connecting devices are indicated generally as 7 and each comprises a shank having oppositely threaded end portions and an enlarged centrally located flattened portion, as 8, which affords a bearing surface for a wrench by means of which the devices are turned. The threaded end portions of the shanks project loosely through the openings 6 and are provided with nuts, as 9, which conformably fit in counter sunk recesses, as 10, which are formed in the outer faces of the legs 5 and aline with the openings 6. By virtue of this engagement of the nuts 9 in the recesses 10, said nuts are held against rotation when the shanks are turned and consequently the half rings 1 may be readily adjusted by proper rotation of said shanks into or out of clamping engagement with the pipes A.

The legs 4 of the angle pieces 3 being secured upon each corrugation of the half rings assure of the even distribution of the clamping force and at the same time materially strengthen the half rings at the points where the greatest stress is placed and thus prevent any straining or distortion of the parts.

In connecting large pipes with corrugated half rings it is difficult or inconvenient to employ a turnbuckle device in the manner in which it is ordinarily used, as for example, by threading the ends of the shanks through the openings 6 and consequently I have adopted the arrangement shown in Figs. 3 and 4. Owing to the fact that the end portions of the shanks pass loosely through the openings 6 the half rings 1 may be quickly assembled upon the pipes A, after which the nuts 9 are turned upon said threaded end portions until they are engaged in the recesses 10. This may be readily accomplished by engaging one nut in its recess and by holding the other nut against rotation with a wrench held in one hand and by turning the shank with a wrench held in the other hand. The second nut will thus be moved axially into its recess.

From the foregoing it will be apparent that the device has a positive and an adjustable clamping action and consequently is thoroughly efficient in operation; that the angle pieces reinforce the half rings at the points where the greatest stress is placed; and that the particular construction of the turnbuckle devices allows of the convenient and quick assemblage or removal of the half rings from the pipes to be connected. The invention is at the same time simple in its structural details and inexpensive to manufacture.

Having fully described my invention, I claim:

1. The combination with two corrugated pipes of a coupling device therefor comprising corrugated half rings for clamping engagement with said devices, angle pieces arranged at the ends of the half rings and comprising curved legs rigidly secured to the half rings, and horizontal outwardly projecting legs and screw devices connecting the opposed horizontal legs.

2. The combination with two corrugated pipes of a coupling device therefor comprising corrugated half rings for clamping engagement with said pipes, horizontally projecting legs provided at the ends of said half rings and having openings therein, said legs having counter sunk recesses alined with said openings, shanks having threaded end portions extended loosely through the openings of corresponding legs, and nuts mounted upon said threaded end portions and engaging conformably and non-rotatably in said recesses.

3. The combination with two pipes and a coupling device therefor comprising half rings having outwardly projecting legs at the ends thereof, said legs having openings and counter sunk recesses alined with said openings, of means for connecting said half rings comprising shanks having threaded end portions passing loosely through said openings and nuts mounted upon said threaded end portions and fitting conformably and non-rotatably in said recesses.

In testimony whereof I have hereunto set my hand in presence of two subscribing witnesses.

GEORGE E. WILSON.

Witnesses:
ELSIE POPPE,
ELIZABETH WILLIHNGANZ.